United States Patent Office

3,030,218
Patented Apr. 17, 1962

3,030,218
METHOD OF MAKING REFRACTORY CLAY PRODUCTS
Gilbert C. Robinson, Clemson, S.C., assignor to Zonolite Company, Evanston, Ill., a corporation of Montana
No Drawing. Filed Jan. 30, 1959, Ser. No. 790,072
5 Claims. (Cl. 106—71)

The present invention relates broadly to the manufacture of light-weight ceramic building materials, and is more particularly concerned with a refractory clay product having a relatively high compressive strength and dimensional stability and relatively low bulk density for structural applications, particularly where acoustical properties are desired.

It has long been conventional to employ masonry units for structural applications, however, one of the reasons underlying the lack of more widespread use of these units has been the difficulties associated with accomplishing the necessary reduction in bulk density and dimensional tolerance of the structural units. Difficulties of various types have been encountered in the prior manufacturing techniques and the products obtained are of substantial cost so that the commercial adoption of light-weight structural clay units has not to the present time occurred.

It is therefore an important aim of the present invention to provide a refractory clay product formed of a ceramic mix and light-weight aggregate, characterized by a relatively high compression strength-to-bulk density ratio and relatively high dimensional stability.

Another object of the invention lies in the provision of a method for the commercial manufacture of fired light-weight structural clay units, whereby there is obtained a product having a desirable crushing strength-to-bulk density ratio, and which can be easily sawed, nailed and machined, as well as finished with glazes or engobes to provide a decorative and moisture impervious surface.

A further object of the invention is to provide a method of making refractory clay products, wherein there is mixed under controlled conditions a light-weight aggregate typified by vermiculite, clay and water of plasticity, the mixture being readily extrudable over a relatively wide range of water contents, employing relatively low quantities of the more expensive clay materials, and producing a refractory clay unit having an improved surface appearance, ease of handling after extrusion, and not requiring deairing prior to the extrusion thereof.

Other objects and advantages of the present invention will become apparent as the description proceeds.

Briefly stated, the present invention is based upon the discovery that a refractory clay product may be produced having a relatively high compressive strength and dimensional stability, as well as a relatively low bulk density, by mixing under carefully controlled conditions a ceramic mix, light-weight aggregate and water of plasticity. It has been found that the processing is improved and a superior product obtained when the light-weight aggregate is prewetted prior to combination with the ceramic mix, when the weight of water of plasticity is closely related to the weight of light-weight aggregate, when the ceramic mix contains a substantial proportion of nonplastic particles, and when the light-weight aggregate is precoated with either an inorganic or organic material. The preferred shaping technique is extrusion, although as will be hereinafter pointed out, a particular pressing procedure gives substantially lower bulk densities for a given quantity of light-weight aggregate. While variations may of course be practiced, the method of this invention may be performed utilizing 5 to 80% by weight of light-weight aggregate, 95 to 20% by weight of ceramic mix, and 15 to 75% total water of plasticity based upon the total weight of ceramic mix and light-weight aggregate.

As used herein, the expression "ceramic mix" means any mixture of clays or other non-metallic minerals that serves as the matrix for the light-weight aggregate. Exemplary of the materials included within the class definition of ceramic mix are the accepted raw materials of the ceramic industry, ranging from such raw materials as talc, pyrophyllite, and wollastonite through kaolins, ball clays, and fire clays to the impure common clays and shales used in structural clay products manufacture. As also used herein, the expression "light-weight aggregate" refers to expanded vermiculite, with or without perlite or haydite or other vesicular materials.

Vermiculite alone as the light-weight aggregate functions to significantly reduce the performance requirements for the clay or ceramic mix. Specifically, in order to attain workability with certain clay product having low plasticity and poor workability, it is necessary to use a blend of a number of clays. On the other hand, when vermiculite is added to the mix, the workability of these clays is improved and in addition, it is possible to operate with the more expensive clays at the lower end of their quantity ranges. Further, and possibly of equal importance, the presence of vermiculite in the complete mixture makes said mixture much less critical as far as the water content is concerned. By way of a specific example, a mixture consisting of 80% clay and 20% perlite can be extruded successfully only when the water of plasticity is in the very narrow range of from 38 to 42%. The same clay containing 10% perlite and 10% vermiculite, on the other hand, can be successfully extruded at any moisture content in the relatively wide range of between 30 and 45%. The advantages thereby obtained in the manufacture of structural clay products are readily apparent to those versed in the ceramic art.

The presence of vermiculite in the complete mixture further improves the surface and appearance of the extruded product, providing a very important advantage in the production of clay tiles whose exterior surfaces are exposed. Handling after extrusion is also improved by the addition of vermiculite, and edge tearing in particular is reduced and the character of the wire cut edge of the ceramic unit is additionally improved. And as a further advantage of the addition under controlled conditions of particular percentages of vermiculite is the elimination of the need for deairing. As for example, a 70% clay and 30% harsh aggregate mix requires deairing in order to obtain a mix that will extrude properly. However, if half of the harsh aggregate is replaced with vermiculite, no deairing is required.

While vermiculite alone has the foregoing noted advantages in the practice of the present method, addition materials may be combined therewith to provide the light-weight aggregate. The aggregate may comprise vermiculite with perlite or haydite or other vesicular materials, including bloated clays, shales, slags or burnouts. Of the other levitators mixed with vermiculite, perlite has produced particularly satisfactory results. The relatively sharp angular particles of perlite appear to combat any tendency toward lamination in the compositions, and further, results obtained to date indicate that it is desirable to use mixtures of perlite and uncoated vermiculite rather than uncoated vermiculite alone when it is desired to use compositions containing 10% by weight or more of levitator. A mixture of perlite and uncoated vermiculite appears to be as effective as precoated vermiculite alone; however, the perlite-uncoated vermiculite mixture requires relatively larger amounts of forming water than the same quantity of precoated vermiculite. As will be shown in the tables appearing hereinafter, the light-weight aggregate may compose from between 5 to 80% by weight of the complete mixture, and of this weight the vermiculite alone or in combination with perlite, haydite or other vesicular materials may vary substantially, while producing substantial improvements in the compressive strength, dimensional stability, and bulk density of the refractory clay product obtained.

The ceramic mix forming the matrix for the light-weight aggregate may be comprised of various combinations of clays, and particularly combinations that include nonplastic constituents. It has been found that natural clays containing the substantial proportion of nonplastic particles, or to which non-plastic, non-metallic minerals are added, reduce shrinkage and lamination and produce more satisfactory results than are obtained from high purity clays. The bond clay used should initially be sufficiently dry to produce a free-flowing granular mass in order to be adapted to the mixing procedure of the present invention.

Clays that have been found suitable for use, either by themselves or in combination, include:
(1) Pre-Cambrian shale, such as used in brick making.
(2) Alluvial clay, also such as used in brick making.
(3) An Alabama coal measure clay used near Birmingham.
(4) A South Carolina sedimentary kaolin.
(5) A Tennessee ball clay.

The other essential ingredient of the complete mixture for extruding or pressing is water, which in accordance with the teachings of this invention is preferably combined in particular amounts with the vermiculite alone in order to effect a prewetting of this light-weight aggregate. Specifically, it has been established that prewetting the vermiculite reduces substantially the quantity of this material required to produce a given reduction in bulk density. The quantity of water is, however, closely related to the weight of vermiculite, and the broad range of water content is from 0.5 to 2.0 pounds of water to each pound of vermiculite. The optimum amount of water first added to the vermiculite, prior to mixing the prewetted vermiculite with the ceramic mix, is one pound of water to one pound of vermiculite, and the preferred range is 0.8 to 1.6 pounds of water for each pound of vermiculite. The mixing procedure accordingly preferably involves first adding a predetermined amount of water to a particular weight of vermiculite, adding the ceramic mix to the wetted aggregate, and continuing the mixing with such additional quantities of water as may be required to produce a complete mixture of the consistency desired.

Prewetting the vermiculite in the manner described has the substantial advantage of avoiding a tendency on the part of the light-weight aggregate to compact, as frequently occurs when all constituents are combined in a single mixing step. By prewetting the light-weight aggregate there is obtained a granular, free-flowing feed which contributes importantly to the quality of the final product.

Any of the commercially available vermiculite materials may be employed in the practice of the present invention, and investigations performed to date have employed a vermiculite which is either essentially minus 6 plus 20 mesh, or minus 20 plus 100 mesh. These particular materials, as well as other presently available commercial varieties of fully exfoliated vermiculite are made up of vermiculite particles that are soft and friable. The particles cannot readily withstand subsequent processing operations which apply pressure or tend to shear the vermiculite granules. Pressure or shearing tends to compact the vermiculite, and thereby reduces its effectiveness as a light-weight aggregate. Accordingly, when an untreated expanded vermiculite is used, there is a tendency, due to the fragile nature of the vermiculite, for this material to collapse when stiff consistencies of mix are employed, with a resulting increase in bulk density and lamination of the product. Consequently, it is best to pretreat the vermiculite in such a manner as to effect a waterproofing or toughening or both.

The coating materials when employed may be of either an organic or inorganic nature. Exemplary of organic coatings which are satisfactory are emulsified asphalt, dextrin, silicone resins and aqueous wax emulsions. Inorganic coatings, on the other hand, which perform effectively for the present purposes are glass, Portland cement, and sodium silicate. The quantity of coating material used may vary from 1 to 100%, or even higher but preferably is between 5 and 75% by weight.

In the case of sodium silicate specifically, the preferred ratio is about one part of sodium silicate (solids content) to four parts of vermiculite, on a dry weight basis, but satisfactory results have been obtained using about four parts of sodium silicate to five parts of vermiculite, dry weight. The utilization of sodium silicate or other inorganic coating materials permits extrusion at much stiffer consistencies and at lower water quantities than is generally possible with uncoated vermiculite. The coating also eliminates any tendency toward lamination in the extruded column.

As examples of organic coatings, the application of three liters of an asphalt admixture containing about 55% by weight of 50–60 penetration asphalt (ref. Patent No. 2,355,966) to four pounds of vermiculite, and the application of one to three liters of a suitable aqueous wax emulsion to four pounds of vermiculite give satisfactorily coated aggregates useful in practicing the method of the present invention. The organic coatings also permit a reduction in the amount of water needed for extrusion and eliminate any lamination tendency. The organic coating further gives lower bulk densities for a given quantity of vermiculite, than does either the uncoated or the inorganic-coated vermiculite. Generally speaking, however, it is necessary to extrude the organic-coated mixture at a consistency intermediate between the consistency of the uncoated and the inorganic-coated material.

While it would be desirable to eliminate the use of coatings for the light-weight aggregate, since coatings increase the bulk density, such increase is largely offset by less compaction and densification during extrusion. Specifically, the volume after extrusion is greater for a given weight of vermiculite if a coating is used, than if no coating at all is used. This follows despite a relatively large proportion by weight of coating to vermiculite because of the extremely low density of vermiculite, about seven pounds per cubic foot. An almost fifty-fifty mixture of sodium silicate and vermiculite on a dry weight basis corresponds, however, to only about 5% of coating material by volume, and the coated vermiculite is compacted to a lesser extent during extrusion than an uncoated vermiculite.

It has been stated in the preceding paragraphs that practice of the present method and formation of the product resulting therefrom are substantially affected by the quantity of vermiculite, the prewetting thereof, the quantity of water, type of bond clay, the precoating of vermiculite, and the addition of other levitators to the vermiculite. There will now be described the tests which have been performed upon which the earlier mentioned conclusions were based, and the results obtained set forth in tabular form, reference being first made to the extrusion of vermiculite-clay mixtures.

EXTRUSION

To determine the influence of the quantity of vermiculite on product properties, two series of compositions were prepared using a fully exfoliated vermiculite in quantities varying from 0 to 60% by weight of the total batch weight.

The bonding material for the vermiculite in the first series of tests was a mixture containing 20% by weight of M and D ball clay and 80% Pre-Cambrian shale that had been crushed to minus 8 mesh. The mixing procedure for this series was first to prewet the vermiculite with one pound of water to each pound of vermiculite. The dry clay mixture was then added to the vermiculite in a ribbon mixer. A final 0.25 pound of water was added to each pound of clay mixture and the compositions were mixed for thirty seconds. The second series utilized as the bonding material an alluvial clay from Augusta, Georgia. The vermiculite was not prewetted in this series, but instead these compositions were prepared by adding all the water to the completed dry mixture. This series differs also from the first series in that the same total quantity of water was used for each composition of this group.

Test bars measuring 1 x 1 x 7" were extruded without evacuating the column. The specimens were dried thoroughly at 220° F., then fired to 1750° F. in twelve hours, and soaked at this temperature for three hours.

The results are shown in Table I, and it is to be noted that the shale series showed a progressive decrease in bulk density and strength as the quantity of vermiculite is increased. An addition of 5% vermiculite reduced the bulk density by 13 pounds per cubic foot, whereas 10% additions of vermiculite gave a total reduction of 25 pounds per cubic foot, and 20% vermiculite reduced the bulk density by 47 pounds per cubic foot. The samples prepared from alluvial clay, on the other hand, showed no reduction in bulk density even with additions of 60% vermiculite. This indicated that the addition of vermiculite alone is not sufficient to control bulk density, but that adjustments must be made in the quantity of water as the quantity of vermiculite is changed.

As earlier noted, the mixing sequence influences substantially the quantity of vermiculite required to produce a given bulk density. It was found that the addition of the water to the mixtures of clay and vermiculite produce a bulk density of 78 pounds per cubic foot for mixtures containing 40% vermiculite. Prewetting the vermiculite before the addition of clay with one pound of water to one pound of vermiculite gave, on the other hand, a bulk density of 69 pounds per cubic foot in a mixture containing only 20% vermiculite.

from 39 to 70% reduced the bulk density by almost 24 pounds per cubic foot, whereas the modulus of rupture decreased from 3551 to 2033 lbs. per sq. in.

Table II.—*Effect of Quantity of Water*

[Firing temp. 1800° F.]

| Specimen No. | Water of plasticity (Percent) | Modulus of rupture (lb./sq. in.) | Bulk density (lb./cu. ft.) | Absorption (Percent) | Total linear shrinkage (Percent) |
|---|---|---|---|---|---|
| R | 39 | 3,551 | 94.2 | 29.2 | 5.4 |
| S | 45 | 3,085 | 86.7 | 34.0 | 5.5 |
| T | 49 | 2,730 | 83.0 | 36.2 | 5.4 |
| U | 56 | 2,874 | 79.2 | 39.4 | 6.7 |
| V | 61 | 2,110 | 73.0 | 47.0 | ---- |
| W | 70 | 2,033 | 70.5 | 48.5 | 7.1 |

A wide variety of bond clays were also tested to determine the criticality of the type of clay in determining the properties of vermiculite-clay mixtures. These clays are set forth in Table III, and the values obtained as to fired strength and bulk density listed.

Table III.—*Effect of Type of Bond Clay*

[Firing temp. 1800° F.]

| Composition (Percent) | | Clay type | Modulus of rupture (lb./sq. in.) | Bulk density (lb./cu. ft.) |
|---|---|---|---|---|
| Vermiculite | Clay | | | |
| 40 | 60 | South Carolina kaolin | 2,586 | 81 |
| 40 | 60 | Georgia alluvial clay [1] | 2,271 | 79 |
| 40 | 60 | Alabama fire-clay [1] | 1,419 | 84 |
| 40 | 60 | Tennessee ball clay | 1,887 | 76 |
| 40 | 60 | South Carolina Pre-Cambrian shale [1] | 1,106 | 83 |

[1] These materials are being used in structural clay products manufacture.

It is to be seen from the above table that the bond clay apparently has little effect on the fired bulk density provided the firing limit of the clay is not exceeded. Probably the most significant result of this investigation was the appearance of the fired bars. The ball-clay composition and kaolin composition showed relatively severe lamination and concave sides, and accordingly are not Table I.—*Effect of Quantity of Vermiculite*

80% PRE-CAMBRIAN SHALE—20% BALL CLAY

[Firing temp. 1750° F.]

| Specimen No. | Vermiculite (wt. percent) | Water of plasticity (percent) | Modulus of rupture (lb./sq. in.) | Bulk density (lb./cu. ft.) | Absorption (percent) | Total linear shrinkage (percent) |
|---|---|---|---|---|---|---|
| 2-A | 0 | 25.0 | 1,935 | 116 | 13.0 | 5.2 |
| 1-B | 2 | 26.4 | 1,929 | 110 | 15.3 | 6.0 |
| 1-C | 5 | 28.8 | 1,689 | 103 | 19.7 | 5.7 |
| 1-D | 10 | 32.5 | 866 | 91 | 29.8 | 4.6 |
| 2-C | 20 | 45.0 | 568 | 69 | ---- | 3.9 |

ALLUVIAL CLAY

| CA | 10 | 28 | 2,500 | 103 | 16.7 | 8.1 |
| CB | 20 | 26 | 1,990 | 105 | 16.6 | 8.2 |
| CC | 40 | 28 | 2,313 | 100 | 19.1 | 5.8 |
| CD | 60 | 28 | 2,324 | 100 | 18.4 | 5.3 |

To determine the effect or importance of water control in extruding vermiculite-clay mixtures, test bars were extruded from a mixture of 60% South Carolina kaolin and 40% number 3 vermiculite. The high water-holding capacity of the vermiculite makes it possible to extrude this composition over a wide range of water contents, and test bars were prepared with the water of plasticity varying from 39 to 70%. The test bars were fired to 1800° F.

As shown in Table II, the quantity of water had a pronounced effect on the bulk density, strength and absorption of the finished product. Increasing the water generally suitable by themselves in structural clay product manufacture due to excessive shrinkage. The remaining types of clays, however, contained sufficient nonplastics to give low firing shrinkage, and these clays produced products with sharp edges and low lamination. It is thus apparent that most structural clay raw materials are satisfactory for vermiculite-clay products, whereas high-purity clays by themselves are not desirable.

Tests were also made as to the relative merits of coated versus uncoated vermiculite, and for this purpose compositions were prepared using uncoated and coated vermiculite (minus 6 plus 20 mesh) in quantities of 10 and 20% by weight of the dry weight of the mixture. The clay bond was a Pre-Cambrian shale, and the vermiculite was coated with a suitable water-asphalt emulsion. The compositions were mixed by prewetting the vermiculite with an equal weight of water, then adding the dry shale, and finally adding the remainder of the desired total water. The compositions were fired at 1750° and 1950° F.

The results of these tests are shown in Table IV below. It can be seen that essentially the only advantage of the coated material in the 10% quantity is that it permitted extrusion at lower water levels, that is, 25% water of plasticity instead of 35%. The 20% quantity showed a more favorable position for the coated material, and it was noted that the uncoated material mixed by prewetting the vermiculite was somewhat difficult to extrude and required a water content of 45% for successful extrusion. The coated material, on the other hand, was easy to extrude and could be extruded at different water levels. A water of plasticity of 30% exceeded the results obtained using 45% water with uncoated material. It was possible also to extrude this composition at a relatively stiff consistency using 20% water of plasticity and yet obtain a reduction in bulk density to 81 pounds per cubic foot. Inorganic coatings were also applied to compositions of various ranges of vermiculite and clay, and these tests also established that precoating vermiculite produces a reduction in the water required for extrusion, a reduction in fired bulk density, and elimination of lamination.

to use compositions containing 10% by weight or more of levitator. A mixture of perlite and uncoated vermiculite is generally as effective as precoated vermiculite alone, however, the perlite-uncoated vermiculite mixture will require larger amounts of forming water than the same quantity of precoated vermiculite.

While not set forth in tabular form herein, tests were also performed to determine the effect of firing temperature on the properties of vermiculite-clay products. A composition containing 20% vermiculite, 40% ball clay and 40% feldspar was selected, and test bars of this composition were fired at 1300° F. and held at this temperature for 12 hours. Other bars were fired to temperatures of 1700° F., 1780° F., and 1880° F. with a two hour soaking time at each of these temperatures.

It was found that there was little change in bulk density or linear shrinkage as the maturing temperature was increased from 1300° through 1780° F. There was, however, a very marked increase in strength with increasing maturing temperature. In general, the maturing temperature for clay-vermiculite products is between 1800 and 2100° F., depending of course on the type of bond clay selected.

Full-sized structural clay units have been made using pilot production machinery, and the composition for these units contained 30% vermiculite (minus 6 plus 20 mesh) precoated with sodium silicate in an amount of 50% by weight of vermiculite and 50% by weight of N Brand sodium silicate, 70% clay by weight composed of one part ball clay, one part kaolin, and two parts feld-

*Table IV.—Effect of Precoating Vermiculite and Mixing Uncoated Vermiculite With Perlite on Fired Properties of Vermiculite-Clay Units*

| Specimen No. | Composition | Firing temp. 1750° F. | | | | Firing temp. 1950° F. | | |
|---|---|---|---|---|---|---|---|---|
| | | Water of plasticity (percent) | Total linear shrinkage (percent) | Modulus of rupture (lb./sq. in.) | Bulk density (lb./cu. ft.) | Total linear shrinkage (percent) | Modulus of rupture (lb./sq. in.) | Bulk density (lb./cu. ft.) |
| 3-E | 10% No. 3 ver. unctd.—90% clay | 25 | 5.1 | 976 | 94 | 6.5 | 879 | 97 |
| 4-E | 10% No. 3 ver. unctd.—90% clay | 30 | 5.3 | 1,183 | 89 | 6.9 | 1,295 | 93 |
| 5-E | 10% No. 3 ver. unctd.—90% clay | 35 | 4.1 | 1,054 | 86 | 6.6 | 963 | 91 |
| 1-F | 10% No. 3 ver. ctd.—90% clay | 15 | 5.0 | 572 | 102 | 5.9 | 1,053 | 105 |
| 2-F | 10% No. 3 ver. ctd.—90% clay | 20 | 5.6 | 731 | 95 | 6.5 | 936 | 97 |
| 3-F | 10% No. 3 ver. ctd.—90% clay | 25 | 7.7 | 962 | 90 | 7.1 | 1,177 | 89 |
| 2-E | 20% No. 3 ver. unctd.²—80% clay | 45 | 3.9 | 568 | 69 | 7.8 | 850 | 84 |
| 1-G | 20% No. 3 ver. ctd.—80% clay | 20 | 4.2 | 431 | 81 | 7.4 | 885 | 86 |
| 1-H | 20% No. 3 ver. ctd.—80% clay | 25 | 4.4 | 493 | 77 | 7.2 | 764 | 80 |
| 1-I | 20% No. 3 ver. ctd.—80% clay | 30 | 5.4 | 429 | 67 | 8.0 | 481 | 68 |
| 3-A | 10% No. 4 ver. unctd.—10% perlite—80% clay | 30 | 4.4 | 708 | 85 | 8.9 | 1,085 | 104 |
| 3-B | 10% No. 4 ver. unctd.—10% perlite—80% clay | 40 | 4.4 | 672 | 74 | 9.3 | 1,055 | 91 |
| 3-C | 10% No. 4 ver. unctd.—10% perlite—80% clay | 45 | 4.8 | 487 | 72 | 10.2 | 984 | 87 |

Note.—ver=Vermiculite; unctd.=Uncoated; ctd.=Coated.

Table IV also sets forth the results of tests performed with mixtures of uncoated vermiculite, perlite and clay. As stated previously, a mixture of clay and perlite alone is very difficult to extrude because of a very narrow range of permissible water contents when perlite is used in amounts of 20% by weight or greater. A composition containing 10% No. 4 vermiculite, 10% minus 65 mesh perlite, and 80% clay has, however, a wide range of permissible water additions. This is shown on Table IV, and it was found possible to extrude this composition at much stiffer consistencies than uncoated vermiculite alone. The composition produced fired brick with a bulk density of 74 pounds per cubic foot, a modulus of rupture of 672 pounds per square inch, and a total linear shrinkage of 4.4%.

Perlite is of course an expanded volcanic rock, and the particular material used in the present investigation has a bulk density of 20 pounds per cubic foot.

The results as set forth in Table IV indicate it is desirable to use mixtures of perlite and uncoated vermiculite, rather than uncoated vermiculite alone when it is desired spar, and 38% water of plasticity (on vermiculite-clay mix).

The precoated vermiculite and an equal weight of water were mixed in a concrete mixer, and the clay mixture was then added together with the balance of water. The batch was placed in the pugmill of a Bonnot Buckeye combination extrusion machine, and tile were extruded without evacuating the mixture. The tile had two cells and measured 4½ by 5½ by 10 inches outside diameter.

The extruded units were placed directly in a drier at 200° F., and dried for four hours and then fired to Orton cone 06. The crushing strength was found to be 1151 pounds per square inch based on the gross area of the tile, and 1841 pounds per square inch based on the solid area. The actual bulk density of the wall material was 77 pounds per cubic foot, and the total linear shrinkage of these units was 5.2%.

The foregoing descriptive material has dealt with the extrusion of vermiculite-clay-water mixtures to produce a structural clay product having a relatively high compressive strength and dimensional stability, as well as a relatively low bulk density for structural applications. Pressing techniques have also been utilized, and it has been found that the successful production of pressed clay-vermiculite units requires relatively careful control of the quantity of mixing water, the forming pressure, the pressing procedure, the mixing method, and the quantity of vermiculite. The influence of these factors will now be dealt with in detail.

The influence of the quantity of water was determined by varying the water of plasticity from 15 to 35%, utilizing a composition comprising a mixture of 30% No. 4 vermiculite, 28% pyrophyllite, 28% kaolin and 14% nepheline syenite. A forming pressure of 200 pounds per square inch was used, and the mixture was pressed into brick measuring 9 by 4½ by 2 inches.

As appears in Table V below, increasing amounts of water produce increases in crushing strength without corresponding increases in bulk density. This influence of water is shown by the increase in strength to bulk density ratio. It was also apparent from the tests that the maximum amount of water that can be used in the mixture is limited to the quantity causing such a soft consistency that the brick do not have sufficient handling strength after pressing.

*Table V.—Effect of Mixing Water and Forming Pressure*

Firing temp. 1800° F.

| Forming pressure (lb./sq. in.) | Water of plasticity (percent) | Crushing strength (lb./sq. in) | Bulk density (lb./cu. ft.) | Strength: density ratio |
|---|---|---|---|---|
| 200 | 15 | 1,039 | 75.7 | 13.7 |
| 200 | 25 | 1,399 | 74.3 | 18.8 |
| 200 | 35 | 1,576 | 76.5 | 20.6 |
| 50 | 25 | 203 | 49.8 | 5.9 |
| 100 | 25 | 988 | 63.7 | 15.5 |
| 200 | 25 | 1,399 | 74.3 | 18.8 |

Appearing also in the Table V are the results of tests to determine the effect of forming pressure on the properties of vermiculite-clay units. Forming pressures of 50, 100 and 200 pounds per square inch were used with the same amount of water of plasticity. It is to be seen from the table that the crushing strength, bulk density and strength to density ratio increased substantially as the forming pressure was increased. It was found that the maximum pressure to avoid a tendency toward pressure cracking is about 200 pounds per square inch, and the desirable range of pressure is between 100 and 200 pounds per square inch.

The effect of pressing procedure on the fired properties of composition 3-A, comprising the earlier noted mixture of No. 4 vermiculite, pyrophyllite, kaolin and nepheline syenite, has also been determined. It was found that the speed of pressure application made no significant difference in the fired properties of the units.

However, the method of application of pressure gave rather significant results. Brick were formed using a vibratory pressure application, rather than a single-stroke application. The vibratory method used 10 strokes, the first stroke giving the lowest pressure and the pressure being increased gradually to the maximum on the final stroke. It required three seconds to apply the pressure by this method, and it was found that vibratory pressing increased the crushing strength from 455 to 939 pounds per square inch, whereas the bulk density increased from 54.9 to 63.8 pounds per cubic foot. Further, the vibratory stroke gave much sharper and stronger edges to the brick, and gave improved handling strength directly after pressing.

Different mixing equipment and mixing methods were investigated to determine desirable mixing procedures for vermiculite-clay products. The mixing sequence greatly influenced the ease of feeding the mixture into the dies. Specifically, a very lumpy or nodulized mixture was obtained if the dry constituents were first mixed together and then the water added, and it was found that this type of mixture was difficult to feed to the press and produced an unsatisfactory finished product. When the desired water was first mixed with vermiculite and the rest of the dry ingredients then mixed therein, however, a granular free-flowing feed was obtained which pressed very well and produced a good finished product.

Mixing times were also investigated utilizing the composition 3-A earlier referred to, the mixing times being varied from 0.5 to 10.5 minutes. Full-sized brick were pressed at 100 and 200 pounds per square inch, and it was noted that at 100 pounds per square inch the crushing strength increased from 437 to 2325 pounds per square inch as the mixing time increased from 0.5 to 10.5 minutes. However, the bulk density also increased, from 54.9 to 86.3 pounds per square feet, and the linear shrinkage increased from 3.2 to 6.7%. Most of the increase in these properties occurred with mixing times above 1.5 minutes. It is thus apparent that short mixing times are preferable for vermiculite-clay products, since long mixing times or intensive mixing actions tend to crush the vermiculite granules and to cause an increase in fired bulk density.

With respect to the quantity of vermiculite, it was found that quantities of 20% vermiculite produced fired units with a bulk density of 70 pounds per cubic foot, and a fired strength of 950 pounds per square inch. A quantity of 60% vermiculite produced fired units with a bulk density of 37 pounds per cubic foot, and a crushing strength of 400 pounds per square inch. As was observed in practicing the extrusion method, the quantity of water exerts a sufficient influence to mask the effect of variations in quantity of vermiculite. The optimum properties for any given vermiculite quantity were obtained when the manufacturing procedure was adjusted to suit this quantity of vermiculite.

Tests were also made using different types of clay as bonding material for the vermiculite, and similar results were obtained as previously discussed in connection with the extrusion method of formation. Thus, the bond clay should contain sufficient nonplastics to produce reasonable firing shrinkage, and sufficient fluxes to produce a strong product at the desired maturing temperature.

The effectiveness of the pressing procedure in the production of full-sized refractory clay products was established utilizing the novel techniques herein disclosed. A composition was employed comprising 20% vermiculite, 28.8% pyrophyllite, 28.8% kaolin, 14.4% nepheline syenite and 8.0% Portland cement, plus 30.0% water of plasticity.

The vermiculite was mixed first with an equal weight of water, and then the other ingredients were added in dry form and thoroughly mixed together.

The units were pressed at 100 pounds per square inch, using a vibratory stroke. The brick so formed were dried for 2 hours at 300° F. and then fired at about 2000° F. for 3 to 6 hours. The brick fired without cracking and had satisfactory strength after firing. The finished product fired to cone 4 gave a crushing strength of 1570 pounds per square inch and had a bulk density of 69 pounds per cubic foot and a linear shrinkage of 4.7%. The units could be easily sawed and nailed, drilled and machined. They could be finished in a variety of colors either by glazing or applying engobes. The moisture expansion of the fired units was found to be less than 0.05%.

In general, the bulk density is reduced to about 65 pounds per cubic foot using 20% of vermiculite, with a crushing strength of 1570 pounds per square inch. The pressing process gives better strength-to-bulk density ratios, and sharper appearing products. It also gives lower bulk densities for a given percentage of vermiculite than does the extrusion process. The best pressing procedure employs a vibratory pressing stroke at a pressure of 100 pounds per square inch.

The vermiculite-clay products can be dried and fired with unusual speed. The exact schedules vary with conditions but a recommended schedule for many products is 2 hours' drying at 300° F., 4 hours to reach maturing temperature, 4 hours' soaking time at maturing temperature (1800 to 2100° F.) and 3 hours' cooling time.

of the light-weight aggregate is either expanded clay or shale, high temperature grog or expanded slag. The results of tests obtained in an investigation of the effect of different kinds of aggregate with a constant clay and constant vermiculite content are set forth in Table VIII.

*Table VI.—Effect of Change in Quantity of Vermiculite*

| Sample | Percent Clay | Percent Vermiculite | Percent Perlite | Dry (Not Fired) Rupture Modulus | Wet Rupture Modulus | Fired Rupture Modulus | Bulk Density gms./cc. | Absorption 1750° F., Percent | Fired Shrinkage 1750° F., Percent | Water of Plasticity, Percent |
|---|---|---|---|---|---|---|---|---|---|---|
| G | 80 | 20 | 0 | 463 | 3.79 | 1,218 | 1.51 | 27.1 | 6.8 | 42.1 |
| H | 80 | 15 | 5 | 379 | 5.69 | 863 | 1.51 | 27.8 | 6.6 | 31.4 |
| I | 80 | 10 | 10 | 262 | 5.13 | 469 | 1.54 | 26.0 | 6.4 | 28.1 |
| J | 80 | 5 | 15 | 282 | 4.21 | 523 | 1.58 | 23.7 | 6.2 | 24.5 |
| K | 80 | 0 | 20 | 184 | 0.00 | 532 | 1.62 | 25.0 | 6.5 | 27.4 |

*Table VII.—Effects Resulting From Changes in Total Quantity of Aggregate*

| Sample | Percent Clay | Percent Vermiculite | Percent Perlite | Dry (Not Fired) Rupture Modulus | Wet Rupture Modulus p.s.i. | Fired Rupture Modulus p.s.i. | Bulk Density gms./cc. | Absorption 1750° F., Percent | Fired Shrinkage 1750° F., Percent | Water of Plasticity, Percent |
|---|---|---|---|---|---|---|---|---|---|---|
| A | 100 | 0.0 | 0.0 | 466 | 17.2 | 778 | 1.84 | 18.6 | 5.2 | 20.7 |
| B | 95 | 2.5 | 2.5 | 427 | 14.6 | 639 | 1.73 | 20.9 | 5.3 | 23.4 |
| D | 80 | 10.0 | 10.0 | 262 | 5.1 | 469 | 1.54 | 26.0 | 6.4 | 28.1 |
| E | 60 | 20.0 | 20.0 | 170 | 4.9 | 357 | 1.27 | 38.9 | 6.1 | 35.2 |
| F | 20 | 40.0 | 40.0 | 316 | 7.7 | 484 | 1.09 | 47.2 | 6.6 | 52.7 |

*Table VIII.—Effect of Different Kinds of Aggregate*

| Sample | Percent Clay | Percent Vermiculite | Percent Aggregate | Dry (Not Fired) Rupture Modulus | Wet Rupture Modulus | Fired Rupture Modulus | Bulk Density | Absorption 1750° F., Percent | Fired Shrinkage 1750° F., Percent | Water of Plasticity, Percent |
|---|---|---|---|---|---|---|---|---|---|---|
| L | 80 | 10 | 10, Expanded clay or shale. | 369 | 7.12 | 771 | 1.75 | 20.6 | 5.5 | 23.0 |
| M | 80 | 10 | 10, High temp. Grog. | 272 | 4.25 | 448 | 1.79 | 20.1 | 6.5 | 24.6 |
| N | 80 | 10 | 10, Expanded Slag. | 254 | 7.66 | 463 | 1.80 | 19.9 | 7.1 | 23.9 |

The effect of additions of vermiculite to a Georgia alluvial clay, in contrast to vermiculite additions to a clay of the Pre-Cambrian shale type referred to above, has also been extensively investigated. This is set forth in Table VI which illustrates the effect of changes in vermiculite quantities to constant percentages of clay, and the effect of adding to the mixture particular percentages by weight of perlite. This table also brings out that as increases are made in the vermiculite quantity, an increase in the rupture modulus of the dry, unfired units is obtained. This is a good measure of the handling characteristics or loss in loading kilns.

Investigations have also been conducted utilizing mixtures in which the clay component was reduced to 20% by weight, and the remaining portion of the mix was equal percentages of vermiculite and perlite. Table VII sets forth the results obtained as to the rupture modulus for dry, wet and fired units, as well as the bulk density, water absorption, fired shrinkage, and water of plasticity.

While the light-weight aggregate is preferably vermiculite alone or in combination with perlite or haydite, it has been found that improvements in the properties of the structural clay product are also obtained when a portion It is to be seen from the foregoing that by practicing the method herein disclosed products are made with a wide range of properties by carefully controlling the manufacturing procedure and composition. The bulk density of structural clay products can be reduced to at least 70 pounds per cubic foot using 20% by weight of vermiculite and reduced to 37 pounds per cubic foot using 60% vermiculite. The 20% composition gives a crushing strength of 950 pounds per square inch, whereas the 60% vermiculite composition gives a crushing strength of 40 pounds per square inch. Pressed units containing 20% vermiculite have a cone 4 fired strength of 1570 pounds per square inch and a bulk density of 69 pounds per cubic foot. The vermiculite units are distinctive for the ease with which they may be cut or machined after firing. The units may be fired with glazes or colored engobes, and are made in a wide variety of shapes. The units are further characterized by less 0.1% variation in dimension.

The presence of vermiculite significantly reduces performance requirements for the clay, and when added to the mix renders said mix much less critical, insofar as water content is concerned. Vermiculite in the mix further improves the surface and appearance of the extruded product, and improves handling after extrusion. Further, there is herein eliminated the need for deairing. And as pointed out previously, the best results are obtained when all or at least part of the desired water is added to the vermiculite before incorporating the clay ingredients in the batch, and precoated vermiculite or vermiculite mixed with perlite is advantageous for the extrusion process when quantities of vermiculite above 10% are used. When a mixture containing a total of 20% by weight vermiculite and perlite is used, the vermiculite desirably comprises 3 to 12% and the perlite 17 to 8%.

As herein used, the expression "refractory clay product" refers generally to an article which has bulk density normally less than 45 lbs./cu. ft. and the ability to withstand sustained temperatures of 1800° F. or higher. A "structural clay product," on the other hand, as used herein refers in general to an article having a bulk density greater than 60 lbs./cu. ft., and which may mature at temperatures below 2000° F. and in certain instances may not be able to withstand temperatures greater than this. The techniques herein disclosed are equally applicable to structural and refractory clay products.

It is to be understood that numerous variations may be practiced in the disclosed method and product obtained therefrom without departure from the novel concepts of the present invention.

I claim as my invention:

1. A method of making a refractory and structural clay product, which comprises first wetting a light-weight vermiculite aggregate with a substantial proportion in the range of 0.5 to 2 pounds per pound of aggregate of the total amount of water of plasticity to be used, mixing in clay particles, adding the balance of water if any to make up said total amount, and subjecting the resulting mixture to pressure to shape the same, the proportions of aggregate and clay particles by weight being about 5 to 80% of light-weight aggregate, 95 to 20% of clay particles and 15 to 75% total water of plasticity based on the total weight of aggregate plus clay particles.

2. A method as defined in claim 1, in which the proportions of aggregate and clay particles by weight are about 5 to 40% of light-weight aggregate, 95 to 60% of clay particles and 15 to 75% total water of plasticity based on the total weight of aggregate plus clay particles and the substantial proportion of water used for initial wetting of the vermiculite is within the range of 0.8 to 1.6 pounds of water per pound of vermiculite.

3. A method as defined in claim 1, in which the proportions of aggregate and clay particles by weight are about 10 to 25% of light-weight aggregate, 90 to 75% of clay particles and 25 to 50% of total water of plasticity based on the total weight of aggregate plus clay particles.

4. A method as defined in claim 1 in which the resulting mixture is extruded to shape the same, also in which the extruded shape is fired at a temperature between 1800 and 2100° F., and further in which the preparations of aggregate and clay particles by weight are about 5 to 40% of light-weight aggregate, 95 to 60% of clay particles and 15 to 75% total water of plasticity based on the total weight of aggregate plus clay particles.

5. A method as defined in claim 1, in which up to one-half of the vermiculite is replaced by a light-weight material selected from the class consisting of perlite, haydite and mixtures thereof.

References Cited in the file of this patent

UNITED STATES PATENTS

| | | |
|---|---|---|
| 2,444,361 | McQuaid | June 29, 1948 |
| 2,509,315 | Rea | May 30, 1950 |
| 2,526,073 | Gardner | Oct. 17, 1950 |
| 2,922,719 | Robinson | Jan. 26, 1960 |